Oct. 20, 1953  J. C. KEETON ET AL  2,656,002
VEHICLE SPEED CONTROL SYSTEM
Filed June 28, 1949  2 Sheets-Sheet 1
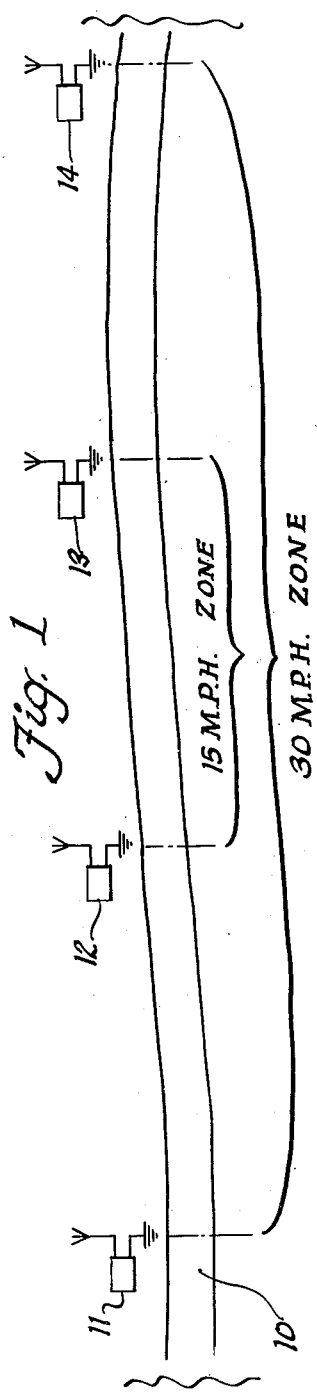
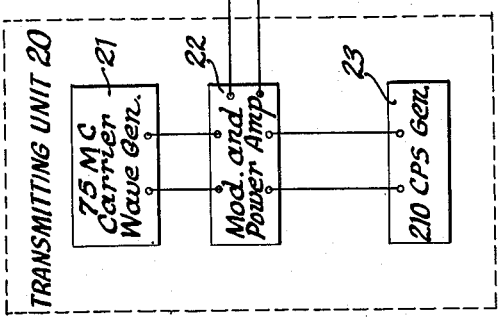
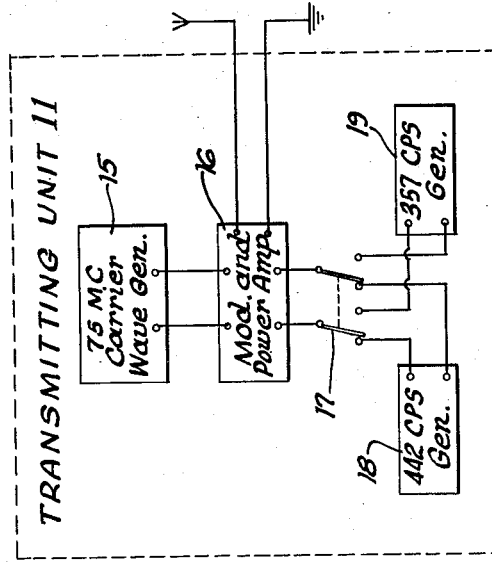
INVENTORS.
James C. Keeton &
Edgar B. Cones
BY
Mason, Kolehmainen, Rathburn & Wyss
Att'ys Patented Oct. 20, 1953

2,656,002

UNITED STATES PATENT OFFICE 2,656,002

VEHICLE SPEED CONTROL SYSTEM

James C. Keeton and Edgar B. Cones, Oklahoma City, Okla.

Application June 28, 1949, Serial No. 101,895

17 Claims. (Cl. 180—82.1)

1

This invention relates to vehicle speed control systems, more particularly to systems and apparatus for automatically controlling the speed of vehicles during operation in restricted speed zones along a highway, and the invention has for an object the provision of improved systems and apparatus of this character.

Vehicle speed control and traffic control systems have heretofore been proposed wherein radio controlled means have been provided for producing suitable visible or audible signals in the event that the vehicle exceeds the permissible speed limit in the zone or area in which it is traveling, and it has also been proposed to utilize various magnetically controlled devices for automatically compelling vehicles to conform to the speed limitations imposed in certain restricted zones. Such prior arrangements, however, have not been found entirely satisfactory in that in some cases cooperation of the operator of the vehicle is required or in that the limitations inevitably imposed by the use of magnetic fields and magnetically controlled devices have resulted in unreliable operation. Accordingly it is a further object of this invention to provide improved, reliable and inexpensive radio systems and apparatus which permit the vehicles to operate normally under the control of the operator in zones of unrestricted speed and which automatically and reliably function to limit the speed of the vehicle in controlled zones to the prescribed speed while permitting normal operation of the vehicle at lower speeds.

It is a further object of the invention to provide a vehicle speed control system in which spaced apart transmitting or control stations are provided at opposite ends of a restricted speed zone for transmitting beams of radio signals capable of energizing vehicle-mounted speed control means as the vehicle passes the control stations so as alternately to render the control means effective or ineffective to control the speed of the vehicle.

It is another object of the invention to provide a system of the above character in which a zone of ordinary caution having a medium speed restriction may contain a more limited zone of extreme caution having a lower speed restriction and in which a vehicle, upon entering the ordinary caution zone, is limited to the medium speed, and upon entering the extreme caution zone, is limited to the lower speed so long as it remains within the extreme caution zone.

It is a still further object of the invention to provide a system of the above character wherein

2 an emergency signal may be employed for stopping vehicles operating either within or without a speed control zone.

Another object of the invention is the provision of a vehicle speed control system wherein low power, high frequency transmitters are employed, the carrier signals of which are modulated with distinguishable low frequency signals determinative of the particular control function to be achieved.

Still another object of the invention is the provision of vehicle-mounted speed control apparatus for use in systems of the character indicated and including receiving apparatus for producing output signals distinctively related to the transmitted signals for selectively effecting the desired speed control, together with speed control means including capacitor or similar impedance means variable in accordance with the speed of the vehicle.

In carrying out the invention in one form, a vehicle speed control system is provided for automatically limiting the speed of vehicles during operation in predetermined zones along the highway, which comprises transmitter means disposed adjacent the highway and operative to transmit beams of signals across the highway at opposite ends of the limited speed zones, together with vehicle-mounted receiving means operative to receive the transmitted signals as the vehicle enters and leaves the zones, normally ineffective speed control means on the vehicle adapted to be rendered effective to limit the speed of operation of the vehicle, and means energizable from the receiving means during reception of the transmitted signals for alternately rendering the speed control means effective and ineffective. More specifically, the speed control means includes an impedance, variable in accordance with the speed of the vehicle, for causing operation of the speed control means at predetermined speeds during those intervals when the speed control means has been rendered effective, and additional impedance means adjustable to select the predetermined speeds at which the speed control means will operate. Preferably the transmitting means comprise low-power high-frequency transmitters, the carrier waves of which are modulated at different low frequencies indicative of the control to be exercised, and the receiving means on the vehicle is operative to produce output signals having frequencies related to the modulating frequencies for selectively controlling a plurality of relay means, one of which, upon alternate energizations thereof, renders the speed control means effective or ineffective, and another of which is operative to adjust the impedance means which controls the speed at which the speed control means operates.

In addition to the above described zone control, the invention contemplates the provision of emergency control means comprising a similar transmitter modulated at a distinctive frequency, together with emergency control means on the vehicle energizable from the receiver means and responsive only to output signals related to the modulating frequency of the emergency means for rendering the speed control means effective to prevent further operation of the vehicle.

For a more complete understanding of the invention reference may now be had to the drawings, in which:

Fig. 1 is a diagrammatic representation of a strip of highway including restricted speed zones and provided with spaced control stations or transmitting means embodying the present invention;

Fig. 2 is a diagrammatic representation of one of the transmitting units employed in Fig. 1;

Fig. 3 is a similar diagrammatic view of an emergency transmitting unit embodying the present invention.

Figure 4:
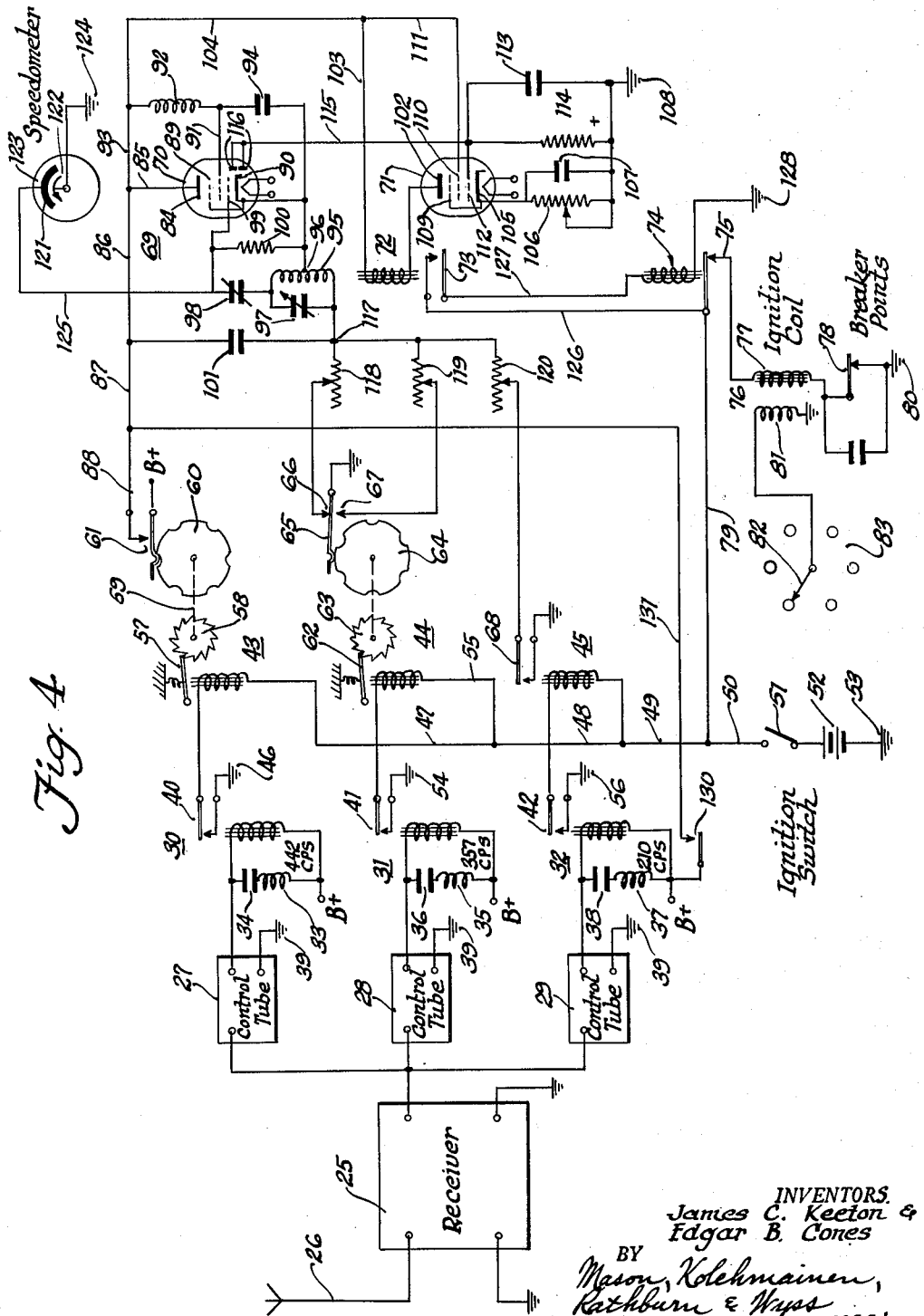
Fig. 4 is a somewhat schematic circuit diagram of vehicle-mounted receiving and speed controlling apparatus embodying the present invention.

Referring now to the drawings, the invention is shown in Fig. 1 as applied to a highway 10 which is divided, as shown, into a restricted speed zone requiring ordinary caution, indicated in Fig. 1 as a "30 M. P. H. zone" within which is contained a more limited speed zone, such, for example, as a school zone, requiring extreme caution and indicated as a "15 M. P. H. zone." As shown in Fig. 1, a plurality of signal transmitting means or transmitting units 11, 12, 13 and 14 are disposed adjacent the highway, the transmitting units 11 and 14 being respectively disposed at opposite ends of the 30 M. P. H. zone, and the transmitting units 12 and 13 being respectively disposed at opposite ends of the 15 M. P. H. zone. The transmitting units may be of identical construction and preferably constitute high or ultra-high frequency crystal controlled signal generators of low power for transmitting beams of carrier waves that are adapted to be modulated with low frequency signals, preferably in the audio range.

As shown in Fig. 2, the transmitting unit 11, for example, comprises a 75 megacycle carrier wave generator 15 for supplying a 75 megacycle signal to a modulator and power amplifier unit 16, which is likewise supplied through a suitable double-pole double-throw switch 17 with a modulation signal of low frequency energy specifically illustrated as a 442 cycle per second modulation signal generator 18. For purposes of flexibility and for uniformity of manufacture, the transmitting unit 11 is likewise equipped with a 357 cycle per second modulation signal generator 19 adapted to be selectively connected to the modulator and power amplifier 16 through the switch 17. In the speed control system indicated in Fig. 1, it will be understood that the transmitting units 12, 13 and 14 are identical with the unit 11 shown in Fig. 2, but in the units 12 and 13 the switch 17 occupies a position such that the 357 cycle per second modulation signal generator is connected to the modulator and power amplifier. Thus, at opposite ends of the 30 M. P. H. zone the carrier wave signals beamed across the highways by the antennas of the transmitting units 11 and 14 will be modulated at 442 cycles per second, while at the ends of the 15 M. P. H. zone the carrier wave signals will be modulated at 357 cycles per second.

In addition to the zone controlling transmitting units 11 to 14, inclusive, the present invention contemplates the provision of emergency control stations which may constitute police cars or ambulances equipped with transmitting units such, for example, as the unit 20 shown in Fig. 3, which are preferably provided with a 75 megacycle carrier wave generator 21, a modulator and power amplifier 22, and a 210 cycle per second modulation signal generator 23 whereby the emergency transmitting units are operative to transmit a carrier wave of the same frequency as the zone control units 11 to 14, inclusive, but modulated at a different low frequency.

As will be more fully explained hereinafter, the present invention contemplates that vehicles operating on the highway 10, for example, shall be equipped with suitable receiving and speed control apparatus adapted to respond to the various signals transmitted at the control stations 11 to 14, inclusive, and the emergency control station 20 in order to effect automatic speed limitation of the vehicle in accordance with the zone requirements or to effect automatic stopping of the vehicle under emergency conditions. Thus the arrangement is such that, as the vehicle traveling along the highway 10 from left to right in Fig. 1, for example, enters the 30 M. P. H. zone, the carrier wave radiated from the transmitting unit 11 will be picked up by the receiving apparatus on the vehicle and the resulting output signal from the receiving apparatus will render the speed control means effective to limit the speed of the vehicle to 30 M. P. H. Upon passing the control station 12, the carrier wave radiated by the transmitting unit 12 will be picked up by the receiver, and the resulting output signal from the receiver will adjust the speed control means so as to thereafter restrict the vehicle to operate below 15 M. P. H. Upon leaving the 15 M. P. H. zone, reception of the signal transmitted from the control station 13 is effective to readjust the speed control means on the vehicle to a 30 M. P. H. limit, and upon leaving the 30 M. P. H. zone, reception of the signal from the control station 14 is effective to render the speed control means ineffective thereafter to limit the speed of the vehicle. If at any time during its travel along the highway 10 emergency conditions arise such that an emergency signal is transmitted from a transmitting unit 20 mounted on a police car or ambulance in the immediate vicinity, reception of the emergency signal by the receiver apparatus on the vehicle will cause the speed control means to immediately render the vehicle incapable of further operation, thus bringing the vehicle to a stop and maintaining the vehicle in this inoperable condition so long as the emergency signal continues.

Referring now to Fig. 4, the receiver 25, which is provided with the usual antenna 26, is of a well known type capable of receiving the 75 megacycle carrier wave signals radiated by the transmitting units 11 to 14 and 20, and of detecting and demodulating these signals so as to produce in the output circuit of the receiver, signals having frequencies respectively related to the modulation frequencies of the carrier waves. Connected in parallel to the output circuit of the receiver 25 through suitable control tubes 27, 28 and 29, are a plurality of tuned or resonant relays 30, 31 and 32, which are adapted to respond only to receiver output signals of predetermined frequencies. Thus, as indicated in Fig. 4, the operating winding of the relay 30 is connected in a tuned circuit which includes a suitable inductance 33 and a capacitance 34 which, with the operating winding, form a tank circuit tuned to a frequency of 442 cycles per second. Similarly, the operating winding of the relay 31, together with an inductance 35 and a capacitance 36, form a tank circuit tuned to resonance at 357 cycles per second, and the operating winding of the relay 32, together with the inductance 37 and the capacitance 38, form a tank circuit tuned to resonance at 210 cycles per second. The energizing circuits for the relays 30, 31 and 32 respectively extend from a source of energy indicated as B+, through the tank circuit and the associated control tube to the other side of the source of energy by way of ground connections 39, and it will be apparent that the relays thus operate only when output signals of the proper frequency appear in the output circuit of the receiver 25.

As shown in Fig. 4, the respective contacts 40, 41 and 42 of the relays 30, 31 and 32 are arranged to complete energizing circuits for the operating windings of additional relays 43, 44 and 45. The energizing circuit for the operating winding of the relay 43 extends, as shown, from a ground connection 46 through the contacts 40 of the relay 30, the operating winding of the relay 43, and by way of the conductors 47, 48, 49 and 50 and the ignition switch 51 of the vehicle to one side of the vehicle battery 52, and from the other side of the battery 52 to the ground connection 53. Similarly, the energizing circuit for the relay 44 extends from the ground connection 54, the contacts 41 of the relay 31, the operating winding of the relay 44, and by way of a conductor 55 to the conductor 48, from whence it extends to ground as in the previously described energizing circuit. Likewise, the energizing circuit for the relay 45 extends from the ground connection 56 through the contacts 42 of the relay 32 and the operating winding of the relay 45, to the conductor 49 and thence to ground through the remainder of the previously traced energizing circuits.

The relay 43, which may be of any type well known in the art capable, on successive energizations, of alternately opening and closing a pair of contacts, is shown as comprising a ratchet type relay having an armature 57 adapted, each time that the winding of the relay 43 is energized, to advance a ratchet wheel 58 through one step, and the ratchet wheel, as indicated by the broken line 59, is connected to drive a suitable contact operating cam or drum 60 so as alternately to open and close a pair of contacts 61. Similarly, the relay 44 is shown as comprising an armature 62 adapted to operate a ratchet wheel 63, which drives a contact operating drum or cam 64 so as alternately to engage a movable contact 65 with one or the other of a pair of spaced contacts 66 and 67. The relay 45, on the other hand, is of a conventional normally open type having a pair of contacts 68 adapted to be closed whenever the operating winding of the relay 45 is energized and to open as soon as the operating winding is deenergized.

The speed control means of the present invention which is associated with and operated by the various relays under the control of the receiver 25, constitutes a capacity operated relay of the general type described at pages 504 and 505 of the textbook, Electron Tubes in Industry, by Keith Henney (2nd ed.), 1937. As shown in the drawing, this speed control means comprises a feed-back type oscillator circuit 69 which includes a duplex-diode-pentode tube 70 arranged to control a pentode power amplifier 71. The plate circuit of the power amplifier 71 includes the operating winding of a relay 72 having a pair of contacts 73 adapted in turn to control the energizing winding of an ignition control relay 74, the normally closed contacts 75 of which are included in the ignition circuit of the vehicle. This ignition circuit is shown as including the usual ignition coil 76 having a primary winding 77 which is connected to cam operated breaker points 78 in an energizing circuit which extends from one side of the battery 52 through the ignition switch 51, the conductors 59 and 79, the normally closed contact 75, and by way of the primary winding 77 and the breaker points 78 to the ground connection 80. The secondary winding of the ignition coil is connected in conventional fashion to the rotating arm 82 of a distributor 83. In general, operation of the oscillator and amplifier to control the relay 72 is effected by means of a speed controlled variable impedance, and the speed at which the relay operation occurs may be adjusted by virtue of additional impedances controlled by the relays 44 and 45.

Referring now to the oscillator circuit 69, the pentode section of the tube 70 which constitutes the sensitive element of the relay circuit includes an anode or plate 84 which is connected through the conductors 85, 86, 87 and 88 to one of the contacts 61 on the relay 43, the other of the contacts 61 being connected to a source of plate voltage, as indicated by the legend B+. In addition, the pentode section of the tube 70 includes the usual suppressor grid 89 connected to the cathode 90, and a screen grid 91 which is connected through a choke coil 92 and the conductors 93 and 85 to the plate 84, and is by-passed, in accordance with conventional practice, by a condenser 94.

The oscillator circuit 69 includes a tank circuit comprising an inductance 95 having a tap 96 to which the cathode 90 is connected and a condenser 97, one terminal of the tank circuit being connected through a grid condenser 98 to the control grid 99 of the pentode section of the tube 70, the usual grid leak resistor 100 and plate blocking condenser 101 being connected as shown.

The pentode power amplifier tube 71 includes a plate 102 connected through the operating winding of the relay 72 and the conductors 103, 104, 93, 86, 87, 88 and the contacts 61 of the relay 43, to a source of plate voltage B+, and the cathode 105 of the power amplifier 71 is connected through an adjustable cathode resistor 106 and a by-passing condenser 107 to ground at 108. The suppressor grid 109 of the tube 71 is connected directly to the cathode, the screen grid 110 is connected through the conductor 111 and the previously traced circuit to the source of screen grid voltage, and the control grid 112 is connected through the usual by-pass condenser 113 and grid leak resistor 114 to ground at 108. As shown in the drawings, the control grid 112 of the tube 71 is connected by means of a conductor 115 to the plates 116 of the diode section of the pentode tube 70, the plates 116 being connected in parallel as shown. The diode circuit, which is effective to impose on the control grid 112 a negative direct current biasing voltage proportional to the peak high frequency voltage existing on the cathode 90 of the tube 70, extends from the plates 116 to the cathode 90 and by way of the portion of the inductance 95 below the tap 96 in the tank circuit to a junction point 117. From the junction point 117 a plurality of alternative paths to ground are provided which include the parallel arranged sensitivity control resistors 118, 119 and 120 and the relay contacts 66, 67 and 68, the diode circuit being completed from the ground connection 108 by way of the grid condenser 113, the grid leak resistance 114 and the conductor 115 to the diode plate 116.

In general, the operation of the speed control means thus far described is such that the biasing potential applied to the grid 112 of the power amplifier tube 71 is dependent upon the operating condition, i. e. the intensity of oscillation, of the oscillator 69, and the adjustment of the sensitivity resistors 118, 119 and 120. In order to control the oscillator 69 in accordance with the speed of the vehicle, variable impedance means are provided comprising a condenser associated with the speedometer 123 of the vehicle and, as shown in Fig. 4, including a stationary condenser plate 121 and a movable plate 122 which is carried by the shaft of the speedometer 123 and adapted to be moved relative to the plate 121 so as to vary the relative capacity thereof. As shown, the movable plate 122 is connected to ground at 124, while the stationary condenser plate 121 is connected by way of a conductor 125 to the control grid 99 of the tube 70. The intensity of oscillation is thus caused to vary with changes in the capacity to ground provided by the speedometer controlled condenser, and, as more fully explained hereinafter, the sensitivity of the circuit may be adjusted by the sensitivity resistors 118, 119 and 120 through which the cathode 90 is connected to ground.

With the foregoing description of the various components of the receiving and speed controlling apparatus in mind, it is though that a complete understanding of the invention may best be had from a description of the operation of the apparatus under various conditions. It will be assumed that the vehicle upon which the apparatus shown in Fig. 4 is mounted is moving down the highway 10 as previously described at a speed less than 30 M. P. H., and enters the 30 M. P. H. zone at the control station 11. Thereupon the receiver 25 will produce in its output circuit an output signal having a frequency of 442 cycles per second so as effectively to energize the relay 30, thereby closing the previously traced energizing circuit for the operating winding of the ratchet type relay 43. Upon the consequent operation of the armature 57 of the relay 43, the ratchet wheel 58 and the cam 60 will be advanced one step so as to close the contacts 61 and thereby apply plate voltage to the tube 70 of the oscillator 69 and to the power amplifier 71. Oscillation at a high amplitude and at a frequency determined by the constants of the oscillator circuit will thereupon be generated in the oscillator circuit 69, and as previously indicated, a rectified current proportional to the high frequency potential on the cathode 90 will be caused to flow through the previously traced diode circuit, including the sensitivity resistor 118 and the contacts 66 and 65 of the relay 44, the contact 65 being in the upper position shown in the drawing. This rectified current will, by virtue of the grid condenser 113 and the grid leak resistor 114, impose a sufficient negative bias on the control grid 112 of the amplifier 71 to bias the amplifier tube beyond cutoff and consequently the relay 72 will not be operated.

If, however, the speed of the vehicle is now increased to 30 M. P. H. thereby moving the condenser plate 122 relative to the stationary condenser plate 121 so as to increase the capacity to ground provided by the speedometer-operated condenser, the intensity of oscillation in the oscillator 69 and accordingly the potential of the cathode 90 will decrease, thereby decreasing the negative bias applied to the grid 112 of the power amplifier 71 from the oscillator circuit so as to decrease the bias of the tube 71 below cutoff. The consequent flow of plate current through the power amplifier 71 effects operation of the contacts 73 of the relay 72 to complete an energizing circuit for the relay 74, which energizing circuit extends from the ground connection 53, the battery 52, the ignition switch 51, the conductors 50, 79 and 126, the contact 73, the conductor 127 and the operating winding of the relay 74 to the ground connection 128. The relay 74 thereupon operates to open the contacts 75 and thereby interrupt the ignition circuit of the vehicle.

Thus the speed of the vehicle will be prevented from increasing above 30 M. P. H. and as soon as the vehicle slows down to a speed of approximately 26 M. P. H. the consequent variation of the speedometer-operated capacitor will so affect the condition of the oscillator 69 as again to bias the power amplifier beyond cutoff, thereby de-energizing the relays 72 and 74 so as to reestablish the ignition circuit to again allow the vehicle propelling means to resume operation.

It will, of course, be understood that if the vehicle at the time it enters the 30 M. P. H. zone is operating at a speed above 30 M. P. H. so that the speedometer-controlled capacitor is at a maximum value, the amplifier tube 71 will not be biased beyond cutoff by the oscillator and current will immediately flow in the plate circuit of the amplifier so as to energize the relays 72 and 74, thereby opening the ignition circuit and preventing further operation of the vehicle propelling means until the vehicle speed has dropped to a valve below 30 M. P. H. While the relay 74 has been shown as controlling the ignition circuit of the vehicle, it will be apparent that this relay may, if desired, be arranged to control the supply of fuel to the propelling means so as similarly to render the propelling means capable or incapable of operation.

When the vehicle passing through the 30 M. P. H. zone reaches the beginning of the 15 M. P. H. zone, the receiver 25 on the vehicle will pick up the modulated carrier transmitted from the control station 12 and will consequently produce in its output circuit an output signal having a frequency of 357 cycles per second, thereby effectively energizing the tuned relay 31 to effect operation of the ratchet type relay 44. Operation of the ratchet wheel 63 and the cam wheel 65 of this relay is effective to open the contacts 65 and 66 and to close the contacts 65 and 67, thereby eliminating the sensitivity resistor 118 from the previously traced diode circuit and substituting in its place the sensitivity resistor 119 which is of lower resistance. Due to the decreased resistance thereby connected between the cathode 90 and ground, the potential of the cathode to ground is decreased so as to impose on the grid 112 of the power amplifier 71 a lower negative bias. The sensitivity of the capacity controlled oscillator and power amplifier thus increases to a point at which operation of the relays 72 and 74 to interrupt the ignition circuit will occur at a lower effective capacity of the speedometer-controlled condenser, i. e. when the condenser reaches a position corresponding to 15 M. P. H. Thus the speed of the vehicle will be limited to 15 M. P. H. until such time as the vehicle passes the control station 13, whereupon the ratchet type relay will again be operated to move the ratchet wheel and the cam 64 one step so as to open the contacts 65—67 and reclose the contacts 65—66, thereby restoring the sensitivity resistor 118 to the circuit and again permitting the vehicle to operate up to 30 M. P. H.

As soon as the vehicle passes out of the 30 M. P. H zone, a signal received from the control station 14 will effect energization of the ratchet type relay 43, thereby opening the contacts 61 so as to remove plate voltage from the tubes 70 and 71, thereby rendering the control means ineffective so that the vehicle may be operated at any desired speed regardless of the position to which the speedometer-controlled capacitor is moved.

If at any time during the operation of the vehicle a signal is transmitted from the emergency control station comprising the transmitter unit 20, the receiver 25, upon receiving the carrier wave from the unit 20, will produce in its output circuit a signal having a frequency of 210 cycles per second, thereby energizing the tuned relay 32 to effect energization of the relay 45 as heretofore explained. In addition, the contacts 130 of the relay 32 will be closed so as to apply plate voltage from the source B+ through the conductor 131 to the tubes 70 and 71, thereby rendering the speed control means effective, the same as upon closure of the contacts 61 of the ratchet 43. Closure of the contacts 68 of the relay 45 is effective to connect the sensitivity resistor 120 in the cathode circuit of the oscillator 69 either alone or in parallel with one or the other of the sensitivity resistors 118 and 119, depending upon whether the vehicle was operating in an unrestricted zone, a 30 M. P. H. zone or a 15 M. P. H. zone at the time of the emergency signal. This resistor 120 is so proportioned that the sensitivity of the capacity-controlled oscillator and amplifier is increased to a point where the capacity of the speedometer wiring to ground is sufficient to decrease the intensity of oscillation to a point permitting the flow of current through the amplifier 71, thereby to operate the relays 72 and 74 to open the ignition circuit. It will be observed that the contacts of the relay 32 will remain closed only so long as the signal from the emergency control unit 20 is being received, and accordingly whenever this signal is terminated, the plate current connection will be interrupted at the contacts 130 and the sensitivity resistor 120 will be cut out of circuit to permit the car to continue operation under whatever controlled speed condition was being encountered at the time that the emergency signal was initiated.

If it is desired to provide a system wherein emergency control of the vehicle can be accomplished only when the vehicle is operating in a limited-speed control zone, it is necessary only to eliminate the contacts 130 on the relay 32, whereupon operation of the relay 32 by the emergency control signal will be effective only if the ratchet type relay 43 has previously been operated to apply plate voltage to the tubes 70 and 71. Similarly if it is desired to provide a system having a 15 M. P. H. zone which is not contained within a 30 M. P. H. zone, this may be effected merely by adding an additional set of contacts to the relay 44 adapted for operation by the cam 64 and arranged to apply and remove plate voltage to and from the tubes 70 and 71 at alternate operations of the relay 44.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent is:

1. A vehicle speed control system for automatically limiting the speed of vehicles during operation in predetermined zones along a highway comprising, a plurality of low-power high-frequency transmitters located adjacent opposite ends of said zones and operative continuously to transmit beams of high-frequency signals across said highway independently of vehicle movement on said highway, said transmitters including means for modulating different ones of said beams at different low frequencies indicative of the degree of speed control to be exercised in said zones, vehicle-mounted fixed-tuned receiving means operative to receive said modulated high frequency signals and to produce output signals having frequencies respectively related to said modulating frequencies, normally ineffective speed control means on said vehicles adapted to be rendered effective to limit the speed of operation of said vehicles, said speed control means including means for varying the maximum speed permitted thereby, and a plurality of tuned-relay means energizable from said receiving means and respectively responsive to output signals of different frequency for rendering said speed control means alternately effective or ineffective and for varying said maximum speed.

2. A vehicle speed control system for automatically limiting the speed of vehicles during operation in predetermined zones along a highway comprising, transmitter means adjacent said highway operative continuously to transmit beams of signals across said highway at opposite ends of said zones independently of vehicle movement on said highway, vehicle-mounted receiving means operative to receive said signals as said vehicles enter and leave said zones, normally ineffective speed control means on said vehicles adapted to be rendered effective to limit the speed of operation of said vehicles, said speed control means including an impedance variable in accordance with the speed of said vehicle for causing operation of said speed control means at predetermined speeds during intervals when said speed control means is effective, and means energizable from said receiving means upon reception of said signals for alternately rendering said speed control means effective or ineffective.

3. A vehicle speed control system for automatically limiting the speed of vehicles during operation in predetermined zones along a highway comprising, a plurality of low-power high-frequency transmitters located adjacent opposite ends of said zones and operative continuously to transmit beams of high-frequency signals across said highway independently of vehicle movement on said highway, vehicle-mounted fixed-tuned receiving means operative to receive said signals as said vehicles enter and leave said zones and to produce output control signals therefrom, normally ineffective speed control means on said vehicle adapted to be rendered effective to limit the speed of operation of said vehicle, said speed control means including an impedance variable in accordance with the speed of said vehicle for causing said speed control means to operate at predetermined speeds during intervals when said speed control means is effective, and means energizable by said control signals for alternately rendering said speed control means effective or ineffective.

4. A vehicle speed control system for automatically limiting the speed of vehicles during operation in predetermined zones along a highway comprising, transmitter means adjacent said highway operative to transmit beams of signals across said highway at opposite ends of said zones, vehicle-mounted receiving means operative to receive said signals as said vehicles enter and leave said zones, normally ineffective speed control means on said vehicles adapted to be rendered effective to limit the speed of operation of said vehicles, said speed control means including capacitor means variable in accordance with the speed of said vehicle for causing operation of said speed control means at predetermined speeds during intervals when said speed control means is effective, and means energizable from said receiving means upon reception of said signals for alternately rendering said speed control means effective or ineffective.

5. A vehicle speed control system for automatically limiting the speed of vehicles during operation in predetermined zones along a highway comprising, a plurality of low-power high-frequency transmitters located adjacent opposite ends of said zones and operative continuously to transmit beams of high-frequency signals across said highway independently of vehicle movement on said highway, said transmitters including means for modulating different ones of said beams at different low frequencies indicative of the degree of speed control to be exercised in said zones, vehicle-mounted fixed-tuned receiving means operative to receive said modulated high frequency signals and to produce output signals having frequencies respectively related to said modulating frequencies, normally ineffective speed control means on said vehicles adapted to be rendered effective to limit the speed of operation of said vehicles, said speed control means including impedance means variable in accordance with the speed of said vehicle for causing operation of said speed control means at predetermined speeds during intervals when said speed control means is effective and also including other impedance means adjustable to select said predetermined speeds, and a plurality of tuned relay means energizable from said receiving means and respectively responsive to output signals of different frequency, one of said relay means being effective on alternate energizations thereof to render said control means effective or ineffective and others of said relay means being effective upon energization thereof to adjust said other impedance means.

6. A vehicle speed control system for automatically limiting the speed of vehicles during operation in predetermined zones along a highway comprising, a plurality of low-power high-frequency transmitters located adjacent opposite ends of said zones and operative continuously to transmit beams of high-frequency signals across said highway independently of vehicle movement on said highway, vehicle-mounted fixed-tuned receiving means operative to receive said signals as said vehicles enter and leave said zones and to produce output control signals therefrom, normally ineffective speed control means on said vehicle adapted to be rendered effective to limit the speed of operation of said vehicle, said speed control means including an impedance variable in accordance with the speed of said vehicle for causing said speed control means to operate at predetermined speeds during intervals when said speed control means is effective, and also including other impedance means adjustable to select said predetermined speeds, and means energizable by said control signals for rendering said speed control means alternately effective or ineffective and for adjusting said other impedance means.

7. A vehicle speed control system for automatically limiting the speed of vehicles during operation in predetermined zones along a highway comprising, transmitter means adjacent said highway operative continuously to transmit beams of signals across said highway at opposite ends of said zones independently of vehicle movement on said highway, vehicle-mounted receiving means operative to receive said signals as said vehicles enter and leave said zones, speed control means on said vehicles for limiting the speed of operation thereof, said speed control means including normally deenergized oscillator means and relay means responsive to a predetermined operating condition of said oscillator means to limit said speed, means energized from said receiving means during successive receptions of said signals for alternately energizing and deenergizing said oscillator means, and impedance means connected in circuit with said oscillator means and variable in accordance with the speed of said vehicle for varying said operating condition when said oscillator means is energized to cause operation of said relay means at predetermined speeds.

8. A vehicle speed control system for automatically limiting the speed of vehicles during operation through a first zone of ordinary caution within which is contained a second zone of extreme caution, comprising a plurality of wave signal transmitters spaced along said highway and respectively located at opposite ends of said zones and operative continuously to transmit beams of signals across said highway independently of vehicle movement on said highway, said beams of signals at said opposite ends of said first zone being distinguishable from said beams of signals at said opposite ends of said second zone, vehicle-mounted fixed-tuned receiver means operative to receive said beams of signals as said vehicles enter and leave said zones and to produce output signals respectively distinctively related to said distinguishable beam signals, normally ineffective speed control means on said vehicles adapted to be rendered effective to limit the speed of the vehicles and including means adjustable to vary the maximum vehicle speed permitted by said speed control means, means energizable from said receiving means and responsive only to output signals distinctively related to carrier beam signals at opposite ends of said first zone for rendering said speed control means alternately effective and ineffective, and other means energizable from said receiving means and responsive only to output signals distinctively related to said beam signals at opposite ends of said second zone for alternately operating said adjustable means to vary said maximum speed between limits corresponding to said first and second zones.

9. A vehicle speed control system for automatically limiting the speed of vehicles during operation through a first zone of ordinary caution within which is contained a second zone of extreme caution, comprising a plurality of wave signal transmitters spaced along said highway and respectively located at opposite ends of said zones and operative continuously to transmit beams of signals across said highway independently of vehicle movement on said highway, said beams of signals at said opposite ends of said first zone being distinguishable from said beams of signals at said opposite ends of said second zone, vehicle-mounted fixed-tuned receiver means operative to receive said beams of signals as said vehicles enter and leave said zones and to produce output signals having frequencies respectively distinctively related to said distinguishable beam signals, normally ineffective speed control means on said vehicles adapted to be rendered effective to limit the speed of the vehicles and including means adjustable to vary the maximum vehicle speed permitted by said speed control means, tuned relay means energizable from said receiving means and responsive only to output signals of frequencies distinctively related to carrier beam signals at opposite ends of said first zone for rendering said speed control means alternately effective and ineffective, and other tuned relay means energizable from said receiving means and responsive only to output signals having frequencies distinctively related to said beam signals at opposite ends of said second zone for alternately operating said adjustable means to vary said maximum speed between limits corresponding to said first and second zones.

10. A vehicle speed control system for automatically limiting the speed of vehicles during operation through a first zone of ordinary caution within which is contained a second zone of extreme caution, comprising a plurality of wave signal transmitters spaced along said highway and respectively located at opposite ends of said zones and operative continuously to transmit beams of signals across said highway independently of vehicle movement on said highway, said beams of signals at said opposite ends of said first zone being distinguishable from said beams of signals at said opposite ends of said second zone, vehicle-mounted fixed-tuned receiver means operative to receive said beams of signals as said vehicles enter and leave said zones and to produce output signals respectively distinctively related to said distinguishable beam signals, normally ineffective speed control means on said vehicles adapted to be rendered effective to limit the speed of the vehicles, said speed control means including impedance means variable in accordance with the speed of said vehicle for causing operation of said speed control means at predetermined speeds during intervals when said speed control means is effective and also including means adjustable to vary said predetermined vehicle speed permitted by said speed control means, means energizable from said receiving means and responsive only to output signals distinctively related to carrier beam signals at opposite ends of said first zone for rendering said speed control means alternately effective and ineffective, and other means energizable from said receiving means and responsive only to output signals distinctively related to said beam signals at opposite ends of said second zone for alternately operating said adjustable means to vary said predetermined speed between limits corresponding to said first and second zones.

11. A vehicle speed control system for automatically limiting the speed of vehicles during operation through a first zone of ordinary caution within which is contained a second zone of extreme caution, comprising a plurality of wave signal transmitters spaced along said highway and respectively located at opposite ends of said zones and operative to transmit beams of signals across said highway, said beams of signals at said opposite ends of said first zone being distinguishable from said beams of signals at said opposite ends of said second zone, vehicle-mounted fixed-tuned receiver means operative to receive said beams of signals as said vehicles enter and leave said zones and to produce output signals of a frequency respectively distinctively related to said distinguishable beam signals, normally ineffective speed control means on said vehicles adapted to be rendered effective to limit the speed of the vehicles, said speed control means including capacitor means variable in accordance with the vehicle speed for causing operation of said speed control means at predetermined speeds during intervals when said speed control means is effective and also including impedance means adjustable to vary said predetermined speed at which said speed control means is operated, tuned relay means energizable from said receiving means and responsive only to output signals of a frequency distinctively related to carrier beam signals at opposite ends of said first zone for rendering said speed control means alternately effective and ineffective, and other tuned relay means energizable from said receiving means and responsive only to output signals of a frequency distinctively related to said beam signals at opposite ends of said second zone for alternately operating said adjustable impedance means to vary said predetermined speed between limits corresponding to said first and second zones.

12. A highway traffic control system for automatically limiting the speed of vehicles during operation through a first zone of ordinary caution within which is contained a second zone of extreme caution, comprising a plurality of transmitters spaced along said highway and respectively located at opposite ends of said zones and operative continuously to transmit beams of carrier wave signals across said highway independently of vehicle movement on said highway, said transmitters at said opposite ends of said first zone including means for modulating said carrier wave signals at a first low frequency and said transmitters at said opposite ends of said second zone including means for modulating said carrier wave signals at a second low frequency, vehicle-mounted fixed-tuned receiver means operative to receive said modulated carrier wave signals as said vehicles enter and leave said zones and to produce output signals having frequencies respectively related to said first and second low frequencies, normally ineffective speed control means on said vehicles adapted to be rendered effective to limit the speed of said vehicle and including means adjustable to vary the maximum vehicle speed permitted by said speed control means, means energizable from said receiving means and responsive only to said output signals of a frequency related to said first low frequency for rendering said speed control means alternately effective and ineffective, and other means energizable from said receiving means and responsive only to said output signals of a frequency related to said second low frequency for alternately operating said adjustable means to vary said maximum speed between limits corresponding to said first and second zones.

13. Wave signal responsive vehicle speed control apparatus for use in traffic control systems of the type including a plurality of low-power high-frequency transmitters operative continuously to transmit distinctively modulated carrier wave signals, comprising fixed-tuned wave signal receiving means operative to receive said carrier wave signals and to produce output signals having frequencies respectively related to said distinctively modulated signals, normally ineffective speed control means operative when rendered effective to limit the speed of the vehicle by temporarily disabling the propelling means therefor whenever the vehicle attains a predetermined speed while permitting operation of said propelling means at lower speeds, said speed control means including impedance means variable in accordance with the vehicle speed for causing operation of said speed control means at said predetermined speed when said speed control means has been rendered effective and also including other impedance means adjustable to vary said predetermined speed, means responsive to successive output signals of one frequency for alternately rendering said speed control means effective or ineffective, and second means responsive to output signals of another frequency for adjusting said other impedance means.

14. Wave signal responsive vehicle speed control apparatus for use in traffic control systems of the type including a plurality of low-power high-frequency transmitters operative continuously to transmit distinctively modulated carrier wave signals, comprising fixed-tuned wave signal receiving means operative to receive said carrier wave signals and to produce output signals having frequencies respectively related to said distinctively modulated signals, normally ineffective speed control means operative when rendered effective to limit the speed of the vehicle by temporarily disabling the propelling means therefor whenever the vehicle attains a predetermined speed while permitting operation of said propelling means at lower speeds, said speed control means including impedance means variable in accordance with the vehicle speed for causing operation of said speed control means at said predetermined speed when said speed control means has been rendered effective and also including other impedance means adjustable to vary said predetermined speed, means responsive to successive output signals of one frequency for alternately rendering said speed control means effective or ineffective, second means responsive to output signals of another frequency for adjusting said other impedance means, and emergency means responsive to output signals of a third frequency for causing said speed control means to disable said propelling means regardless of the speed of operation of said vehicle.

15. A vehicle speed control system for automatically limiting the speed of vehicles during operation through zones along a path of travel comprising, transmitter means operative continuously to transmit beams of signals across said path of travel at opposite ends of said zones independently of vehicle movement along said path of travel, the transmitter associated with each of said zones having a characteristic propagated signal, vehicle-mounted receiving means operative to receive said signals as said vehicles enter and leave said zones, means controlled in accordance with the characteristics of the signals received by the receiving means for selectively establishing a first parameter condition, means responsive to the speed of the vehicles for establishing a second parameter condition, and means controlled in accordance with a comparison of said first and second parameter conditions for controlling the speed of said vehicles.

16. A vehicle speed control system for automatically limiting the speed of vehicles during operation through zones along a path of travel comprising, transmitter means operative continuously to transmit beams of signals across said path of travel at opposite ends of said zones independently of vehicle movement along said path of travel, the transmitter associated with each of said zones having a characteristic propagated signal, vehicle-mounted receiving means operative to receive said signals as said vehicles enter and leave said zones, means on said vehicles for limiting the speed of said vehicles to predetermined speeds, means responsive to said received signals for selecting one of said predetermined speeds, speed responsive means on said vehicles for producing a particular parameter upon the vehicles attaining said selected one of said predetermined speeds, and means responsive to said particular parameter for operating said speed control means.

17. A vehicle speed control system for automatically limiting the speed of vehicles during operation through zones along a path of travel comprising, transmitter means operative continuously to transmit beams of signals across said path of travel at opposite ends of said zones independently of vehicle movement along said path of travel, the transmitter associated with each of said zones having a characteristic propagated signal, vehicle-mounted receiving means operative to receive said signals as said vehicles enter and leave said zones, electrically responsive means on said vehicles for controlling the speed thereof, means controlled in accordance with the characteristics of the signals received for conditioning said speed controlling means to respond to different levels of control, means responsive to the speed of said vehicles for producing different control levels, and means responsive to the attainment of said different control levels for causing response of said speed controlling means.

JAMES C. KEETON.
EDGAR B. CONES.

References Cited in the file of this patent
UNITED STATES PATENTS

| Number | Name | Date |
|---|---|---|
| 1,816,628 | Williams et al. | July 28, 1931 |
| 1,846,032 | Hart | Feb. 23, 1932 |
| 2,025,106 | Hirshfeld | Dec. 24, 1935 |
| 2,131,042 | Halstead | Sept. 27, 1938 |
| 2,133,285 | Dunmore | Oct. 18, 1938 |
| 2,188,293 | Williams | Jan. 23, 1940 |
| 2,279,246 | Podliasky et al. | Apr. 7, 1942 |
| 2,282,102 | Tunick | May 5, 1942 |
| 2,307,583 | Hammond | Jan. 5, 1943 |
| 2,490,768 | Althouse | Dec. 13, 1949 |